May 16, 1939.  A. L. PARKER  2,158,478
PRESSURE RELIEF VALVE
Filed June 19, 1936  2 Sheets-Sheet 1
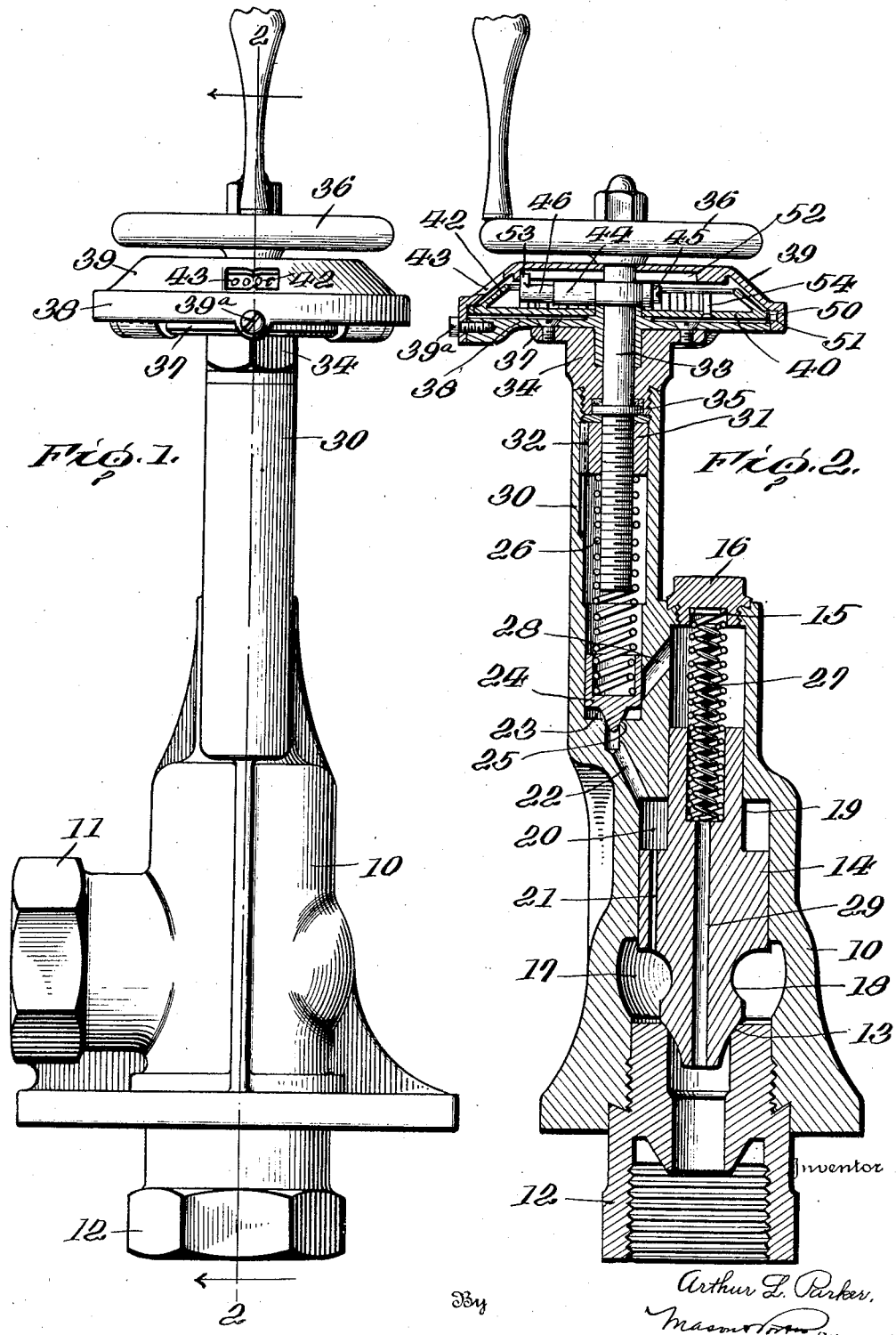

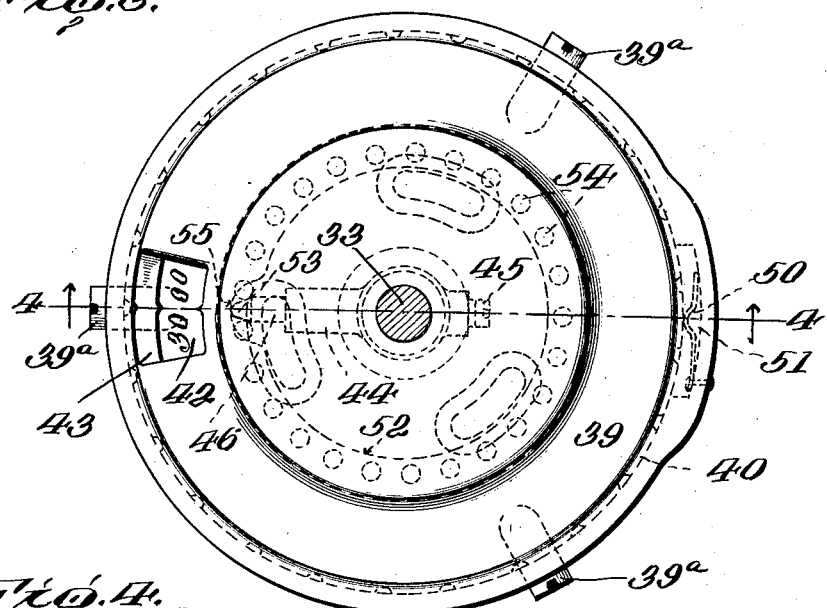
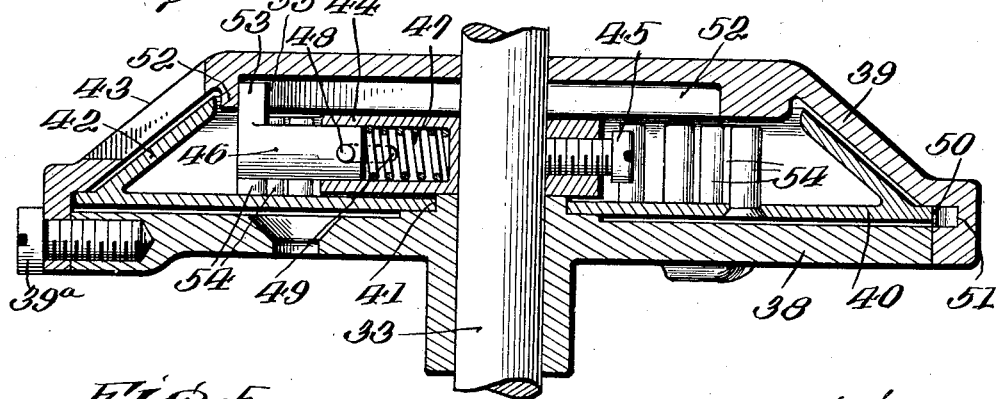
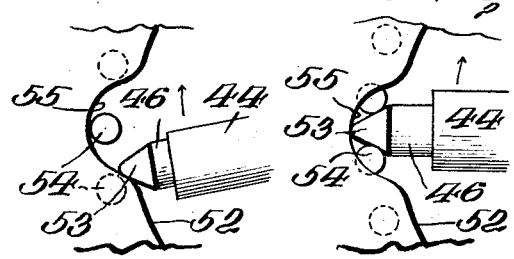
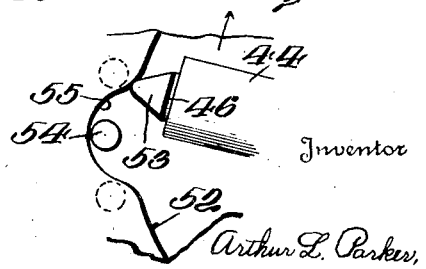

Patented May 16, 1939

2,158,478

UNITED STATES PATENT OFFICE 2,158,478

PRESSURE RELIEF VALVE

Arthur L. Parker, Cleveland, Ohio

Application June 19, 1936, Serial No. 86,172

1 Claim. (Cl. 137—53)

This invention relates to pressure relief valves which are adapted to be used in fluid supply systems to regulate the pressure at which the fluid is delivered therefrom.

The general object of the invention is to provide a new and improved pressure relief valve which is controlled by differential opposed pressures, so that it will open at a predetermined pressure and remain in such a position while the pressure of the issuing fluid is uniformly maintained at the point desired.

A further object of the invention is to provide, in connection with a pressure relief valve, a pilot valve which opens under a predetermined pressure and, in so doing, causes the pressure relief valve to open.

A still further object is to provide improved means to hold the pressure relief valve steady, so that it will not chatter.

The preferred embodiment of the invention and the manner in which it operates will be described in detail in connection with the accompanying drawings, in which,—

Figure 1 is a side elevation of a valve embodying the invention.

Figure 2 is a section taken substantially on the line 2—2 of Figure 1.

Figure 3 is a plan view, on an enlarged scale, of the means for selectively setting the valve for a predetermined pressure and indicating the same.

Figure 4 is an enlarged sectional view taken on the line 4—4 of Figure 3.

Figures 5, 6 and 7 are detail views showing successive positions of the parts in setting the valve.

As shown in the drawings, the housing 10 is provided with an inlet 11 adapted to be connected with a supply chamber from which it receives fluid under pressure and with an outlet 12 which is formed with a valve seat 13. The outlet 12 is removable to permit the pressure relief valve 14 to be reciprocably mounted within the housing 10. A spring 15 seated against a plug 16 in the housing urges the valve against the seat 13.

The lower portion of the housing 10 is formed with an annular pressure chamber 17 about the reduced lower portion 18 of the valve 14 adjacent the inlet 11 and the upper portion of the valve is reduced, as at 19, leaving an annular chamber 20 which is in constant communication through a duct 21 with the chamber 17.

A relief port 22 leads from the chamber 20 to a chamber 23, in which a pilot valve 24 is reciprocably mounted. The valve 24 is adapted to be closed against its seat 25 by a spring 26 until it is opened by a predetermined pressure from the chamber 20.

When the valves 14 and 24 are both closed, the pressures in the chambers 17 and 20 will be equal. The diameter of the valve seat 13 is slightly greater than the diameter of the reduced portion 18 of the pressure relief valve. Assuming that the major diameter of the valve 14 is $a$, that the diameter of the reduced portion 19 is $b$, and that the diameter of the valve seat 13 is $c$; then the pressure tending to seat the valve is proportional to $a^2-b^2$ and the pressure tending to lift the valve is proportional to $a^2-c^2$. Since $c$ is greater than $b$, the valve will remain closed.

However, when the pressure reaches the predetermined point where the valve 24 opens, the fluid in the chamber 20 escapes through the port 22 faster than it is built up through the duct 21, with the result that the valve 14 will open. Fluid will then flow through the outlet 12 at the accumulated pressure in the chamber 17 which was necessary to open the valve 24.

Another spring 27, preferably housed within the spring 15 and shorter than the latter, comes into action after the valve 14 has been raised slightly from its seat. This prevents the valve from opening wider, maintaining the opening substantially constant for the peredetermined pressure, and prevents the valve from fluttering or chattering.

In case the pressure at the inlet 11 and in the chamber 17 tends to rise above the predetermined pressure, a slight further rise of the pilot valve 24 relieves the potential excess pressure through the by-pass 28, 29.

The pilot valve 24 is mounted within an extension 30 of the housing 10, in which a follower 31 is slidably keyed, as at 32, and constitutes an adjustable seat for the upper end of the spring 26. An adjusting screw 33 is rotatably mounted in a plug 34 which closes the upper end of the housing extension 30.

Longitudinal movement of the screw 33 is precluded by an integral circumferential flange 35 which is seated between suitable packing glands. The screw 33 may be conveniently turned, to adjust the tension of the spring 26, by means of a hand wheel 36 suitably secured to its upper end.

The plug 34 is formed with a peripheral flange 37, to which a plate 38 is suitably secured. A housing 39, secured to this plate by screws 39ᵃ or the like, contains an indicator wheel 40 which is journaled on a hub 41 projecting above the surface of the plate. Means are provided for turning the indicator wheel 40 one step for each revolution of the hand wheel 36. The indicator wheel is provided with a face 42 which may be seen through a window 43 in the housing and which is calibrated to indicate the pressure for which the screw 33, follower 31 and spring 26 are set.

In order to effect the step by step movement of the indicator wheel 40, a rotor 44 is secured to the shank of the screw 33 by a set screw 45 or other suitable means. A plunger 46 is slidably mounted in the rotor and is pressed outwardly by a spring 47, being guided by a pin 48 which projects into a slot 49 in the rotor. The indicator wheel is held against accidental displacement by a snap spring 50 which is mounted in a recess 51 in the housing 39 and bears against the periphery of the wheel.

A track 52 is formed on the inside of the housing 39 and the plunger 46 is formed with a nose 53 which is adapted to ride on this track as the indicator wheel is rotated. The indicator wheel is provided with a circular row of upstanding pins 54 and with notches in the periphery thereof, which notches are indicated in dotted lines in Figure 3. The track 52 is formed adjacent the window 43 with a curved recess 55 which allows the plunger to be projected by the spring 47 into engagement with one of the pins 54 as it reaches the position shown in Figure 5, moving in the direction of the arrow. As the indicator wheel and plunger reach the position shown in Figure 6, the spring 50 engages one of the notches in the periphery of the wheel and the position of the latter is stabilized with the pressure reading for which the valve is set visible through the window 43. As the screw 33 is rotated again to increase the pressure, the plunger leaves the recess 55, with the wheel 40 and the pins 54 in the position shown in Figure 7, until the wheel approaches again the completion of a revolution, as shown in Figure 5.

For operation, the inlet 11 is placed in communication with a fluid supply under pressure and the outlet 12 is connected to the delivery nozzle. The valves 24 and 14 are held closed until the pressure in the chamber 17 and consequently in the chamber 20 reaches the point for which the pilot valve is set to open, as indicated by the figures visible through the window 43. The opening of the valve 24 relieves the pressure in the chamber 20 faster than it can be built up through the duct 21, so that the downward pressure on the valve 14 is overbalanced by the upward pressure in the chamber 17. The valve then opens against the resistance of the spring 15 to a point which is determined by the length of the inner spring 27. The valve 14 is then held in a stable position without chattering, as long as the fluid supply chamber is maintained at a pressure sufficient to provide the desired pressure at the nozzle.

If it is desired to set the valve for a higher or lower pressure, all that is necessary to do is to rotate the hand wheel 36 and screw 33 to the right or left, as the case may be, until the desired setting can be read through the window 43.

While for the purpose of illustration, I have shown and described in detail one embodiment of the invention, it is to be understood that it also embraces all such modifications as may be made within the scope of the appended claim.

Having thus described the invention, what I claim as new and desire to secure by Letters Patent, is:

The combination with a fluid pressure chamber having an outlet with a seat through which fluid is delivered, of a main relief valve cooperating with said seat and shaped to present unequal opposed pressure areas, the lesser pressure area being in said chamber and tending to open the valve, the larger pressure area tending to close the valve, a second chamber containing the larger pressure area and in constant communication with the first chamber, a third chamber at the end of said valve remote from its seat, a passage through said valve connecting said third chamber to the outlet, a pilot valve, a chamber within which the pilot valve is normally seated, the pilot valve seat being in constant communication with said second chamber, whereby a predetermined pressure in the latter unseats the valve, a passage from the pilot valve chamber to said third chamber and adapted to be uncovered by the pilot valve only after it has been raised a predetermined distance from its seat.

ARTHUR L. PARKER.